Dec. 14, 1926.

F. LANG

COMBUSTION POWER ENGINE

Filed Sept. 25 1925

1,610,294

Inventor
Franz Lang
by Steward & McKay
his attorneys

Patented Dec. 14, 1926.

1,610,294

UNITED STATES PATENT OFFICE.

FRANZ LANG, OF STUTTGART, GERMANY.

COMBUSTION POWER ENGINE.

Application filed September 25, 1925, Serial No. 58,598, and in Germany October 2, 1924.

The present invention relates to a combustion power engine which is provided with at least one special mixing or preliminary combustion chamber. The characterizing feature of the invention is, that the mixing or preliminary combustion chamber containing the fuel injection nozzle is laterally arranged on the cylinder and communicates by means of a nozzle-like acting overflow-opening with the combustion space within the cylinder. In this manner a thorough whirling and mixing of the injected fuel with the air forced into the preliminary chamber through the overflow-nozzle is effected.

In the accompanying drawing, in which two forms of construction of my invention are illustrated by way of example:

In both forms of construction a mixing or preliminary combustion chamber $b$ is arranged laterally on the upright cylinder $Z$ of a combustion power engine and adjacent to the cylinder head, said chamber $b$ being connected with the cylinder combustion space $d$ by a nozzle-like acting opening $c$. The fuel is injected into the combustion chamber $b$ by means of a nozzle $a$. In both forms of construction $e$ indicates the air inlet valve and $f$ indicates the exhaust-valve of the motor cylinder, working in four-cycle operation, the reciprocating piston $g$ of said cylinder being shown in its upper dead center position.

During the compression stroke the air present in the cylinder combustion space $d$ is compressed and on account of the nozzle action in the overflow-opening $c$ flows through said opening into the mixing chamber $b$, producing therein a violent whirling of the air. The fuel which is injected through the nozzle $a$ in finely divided state contacts with said whirl and mixes so thoroughly with the compressed air, that in the mixing chamber a combustion is started. The pressure increase resulting therefrom drives the mixture from the preliminary chamber into the cylinder combustion space $d$.

Figure 1:
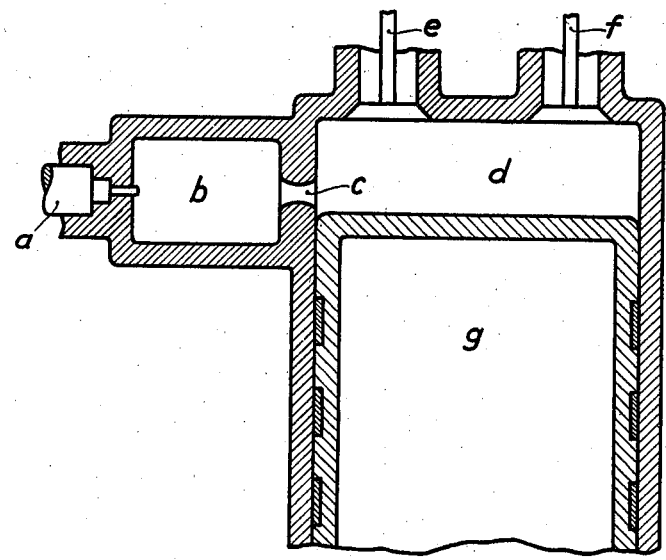
Fig. 1 shows in longitudinal section the first form of construction.
Figure 2:
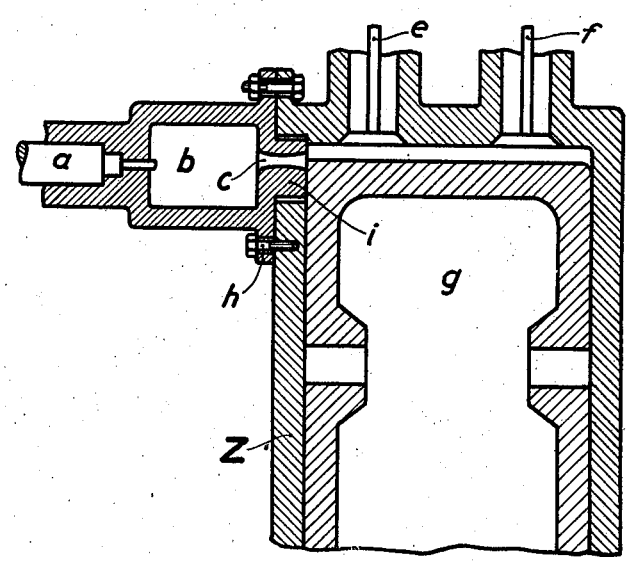
Fig. 2 shows also in longitudinal section the second form of construction.

In the second form of construction, illustrated in Fig. 2, the part forming the preliminary chamber is connected to the cylinder $Z$ by means of a flange and is secured by screws $h$. In contradistinction to the arrangement according to Fig. 1 the whirl in the preliminary chamber is increased at the end of the compression stroke thereby, that the piston $g$ covers the nozzle-like action overflow-opening $c$, so that on account of the reduced sectional area of this passage an increased speed of the air overflowing towards the mixing chamber is obtained.

The overflow-opening $c$ is arranged eccentrically in a centering stud $i$ provided on the body of the preliminary chamber. When the entire body of the preliminary chamber is turned around the centering stud $i$, the vertical position of the overflow-opening is altered and therewith also the proportion, in which the piston covers the overflow-opening. Accordingly it is possible to adjust the overflow-opening in the most favorable vertical position.

It it self evident, that the combustion spaces shown in the drawing can be constructed in a different manner and also the arrangement and position of the injection-nozzle can be changed, for instance the latter can be arranged vertically or obliquely. Further the cross sectional shape of the overflow-opening can be selected as it may appear to be desirable, and a plurality of overflow-openings can be provided between the preliminary chamber and the cylinder.

In case that several preliminary chambers are present it is possible, provided that the overflow-openings are adapted to be partly covered by the piston in accordance with the just described second form of construction, to arrange some of the overflow-openings adjustable and the remaining ones stationary.

I claim:

1. A combustion power engine with self ignition, comprising, in combination, a special mixing- or preliminary combustion chamber arranged laterally on each cylinder, a fuel injection nozzle provided within said preliminary chamber and a nozzle-like overflow-opening connecting said preliminary chamber with the cylinder combustion space, said overflow-opening being adapted to be partly covered by the cylinder piston during its compression stroke, in order to change the overflow- and whirling relations of the air- and mixture-quantities passing through the nozzle-like overflow-opening.

2. A combustion power engine with self ignition, comprising, in combination, a special mixing- or preliminary combustion chamber arranged laterally on each cylinder, a fuel injection nozzle provided within said preliminary chamber and a nozzle-like overflow-opening connecting said preliminary chamber with the cylinder combustion space, said overflow-opening being adapted, to be partly covered by the cylinder piston during its compression stroke, and being further adapted to be adjusted longitudinal of the piston stroke.

3. In an internal combustion engine, the combination, with a cylinder, of a hollow body mounted for rotatable movement in the cylinder wall, said body providing a special mixing or preliminary combustion chamber communicating with said cylinder by a nozzle-like opening adapted to be partly covered by the piston during its compression stroke, said opening being arranged eccentrically of said body whereby rotatable movement of said body will adjust the position of said opening longitudinally of the piston stroke.

In testimony whereof I have hereunto affixed my signature.

FRANZ LANG.